(12) United States Patent
Hillier et al.

(10) Patent No.: US 12,314,612 B2
(45) Date of Patent: May 27, 2025

(54) RESTRICTED TRANSPORT STORAGE CARTRIDGES

(71) Applicant: HEWLETT PACKARD ENTERPRISE DEVELOPMENT LP, Houston, TX (US)

(72) Inventors: Christopher Anthony Grant Hillier, Ft. Collins, CO (US); Curtis C. Ballard, Eaton, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 569 days.

(21) Appl. No.: 16/941,688

(22) Filed: Jul. 29, 2020

(65) Prior Publication Data
US 2022/0035575 A1   Feb. 3, 2022

(51) Int. Cl.
*G06F 3/06* (2006.01)
*G11B 15/473* (2006.01)
*H04L 9/08* (2006.01)

(52) U.S. Cl.
CPC .......... *G06F 3/0682* (2013.01); *G06F 3/0607* (2013.01); *G06F 3/0659* (2013.01); *G11B 15/473* (2013.01); *H04L 9/085* (2013.01); *H04L 9/0861* (2013.01)

(58) Field of Classification Search
CPC ....... G06F 3/0659; G06F 3/0671–0689; G06F 12/14–1491; G11B 15/675–67597; G11B 15/68–6895; H04L 9/085
USPC ............. 360/99.13–99.14; 711/163–164; 720/725–737; 726/1–36
See application file for complete search history.

(56) References Cited

U.S. PATENT DOCUMENTS

| | | | |
|---|---|---|---|
| 6,425,059 B1* | 7/2002 | Basham | G11B 27/002 711/202 |
| 6,745,281 B1* | 6/2004 | Saegusa | H04L 63/10 709/215 |
| 6,845,431 B2 | 1/2005 | Camble et al. | |
| 7,580,950 B2 | 8/2009 | Kavuri et al. | |
| 7,773,465 B2 | 8/2010 | Goodman et al. | |
| 9,170,745 B2 | 10/2015 | Klein et al. | |
| 9,984,008 B1 | 5/2018 | Akmal et al. | |
| 2008/0235476 A1* | 9/2008 | Goodman | G06F 3/0686 711/163 |

(Continued)

OTHER PUBLICATIONS

Hewlett Packard Enterprise Development LP, "HP Command View for Tape Libraries Software—Secure Manager," accessed Jul. 28, 2020, <https://support.hpe.com/hpesc/public/docDisplay?docLocale=en_US&docId=emr_na-c00796549#N10013> (10 pages).

(Continued)

*Primary Examiner* — Eric T Oberly
(74) *Attorney, Agent, or Firm* — Trop, Pruner & Hu, P.C.

(57) ABSTRACT

In some examples, a computer receives a command to transport a storage cartridge in a storage system from a physical storage slot to a storage drive, and determines whether the storage cartridge is associated with a restricted transport indication set by a configuration operation in the storage system. In response to determining that the storage cartridge is associated with the restricted transport indication, the computer checks for an indication of receipt of an access secret information, and denies processing of the command to transport the storage cartridge if the indication of receipt of the access secret information is not present.

19 Claims, 7 Drawing Sheets

(56) References Cited

U.S. PATENT DOCUMENTS

| | | | |
|---|---|---|---|
| 2009/0109565 A1* | 4/2009 | Thompson | G11B 23/042 |
| | | | 360/69 |
| 2011/0019304 A1 | 1/2011 | Heineman et al. | |
| 2018/0137064 A1* | 5/2018 | Akmal | G11B 20/00876 |
| 2022/0067126 A1* | 3/2022 | Jakobsson | H04L 63/10 |

OTHER PUBLICATIONS

Hewlett Packard Enterprise Development LP, "HPE StoreEver MSL 3040 Tape Library—Secure Manager," accessed Jul. 29, 2020, <https://support.hpe.com/hpesc/public/docDisplay?docId=a00041302en_us&docLocale=en_US> (4 pages).

HPE Support Center; "HP StorageWorks MSL8096 Tape Library—Operator Control Panel (OCP)"; 9 pages; printed on Dec. 11, 2019 from webpage: https://support.hpe.com/hpsc/doc/public/display?docId=emr_na-c01056168.

Quantaum; "User's Guide Scalar i6000"; Sep. 2014; 718 pages.

Spectralogic.com; "Spectra Stack Library User Guide"; Mar. 2019; 214 pages.

Ultrium LTO; "Data Protection's Future is Bright"; Aug. 21, 2018; 3 pages.

Wikipedia, NVM Express last edited Jun. 4, 2020 (12 pages).

Wikipedia, SCSI last edited Jan. 18, 2020 (9 pages).

IBM Corp., "IBM System Storage TS3310 Tape Library SCSI Reference," first edition, Oct. 2005, 105 Pages.

\* cited by examiner

RESTRICTED TRANSPORT STORAGE CARTRIDGES

BACKGROUND

Storage systems may store digital information in a tape cartridge. A tape drive is an electronic device that can read data from, write data to, and initialize a tape cartridge. A tape cartridge may include and house a reel of tape and may be loaded into the tape drive to make the tape cartridge available for reading, writing, and/or initialization. The tape housed in the tape cartridge is in the form of an elongated storage medium that is movable across a tape head of a tape drive. The storage medium of a tape cartridge can include a magnetic storage medium or an optical storage medium.

BRIEF DESCRIPTION OF THE DRAWINGS

Some implementations of the present disclosure are described with respect to the following figures.

Figure 1:
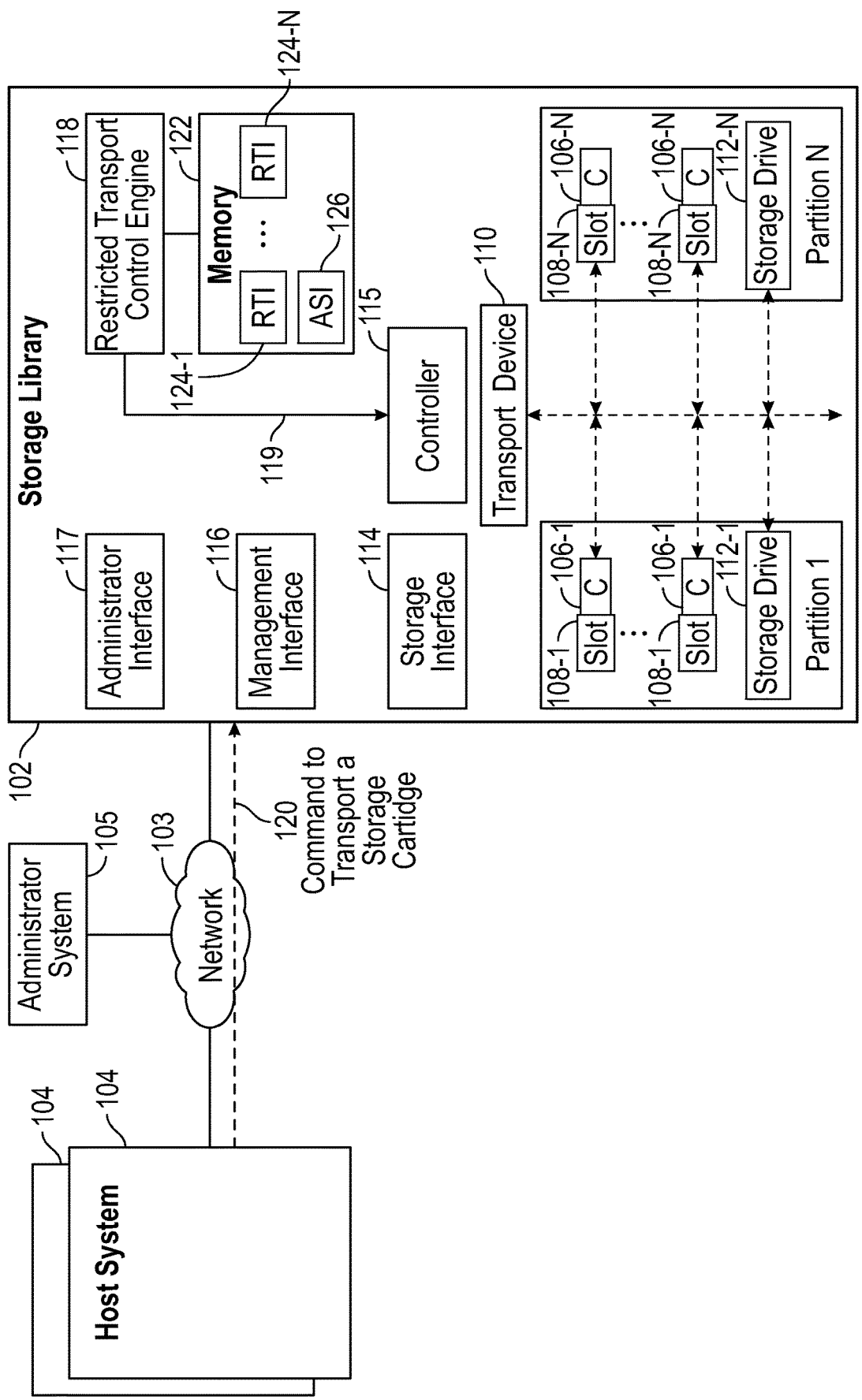
FIG. 1 is a block diagram of an arrangement including a storage library according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "tape library" can refer to a physical structure in which multiple tape cartridges can be housed. The tape cartridges may be physically stored in physical storage slots of the tape library. A physical storage slot is a receptacle or chamber in which a tape cartridge can be placed and removed.

The tape library can also include a tape cartridge transport device (or multiple tape transport devices) and a tape drive (or multiple tape drives). A tape cartridge transport device can include a robot, a tape cartridge picker, a tape cartridge gripper, a tape cartridge carriage, or any other type of mechanism to transport a tape cartridge. The tape cartridge transport device can physically transport a tape cartridge from a physical storage slot to a tape drive, and vice versa.

A tape drive includes a motor to rotate a reel of a tape cartridge that is loaded in the tape drive. The rotation of the tape cartridge reel causes winding or unwinding of a tape in the tape cartridge, which causes the tape to move in the tape cartridge or into or out of the tape cartridge. The tape drive also includes a tape head with read elements and write elements to read data on a tape of the tape cartridge and to write data to the tape.

A tape library may receive commands from a user or computing device to transport a tape cartridge from a storage slot and load the tape cartridge into a tape drive. The commands received by the tape library are processed by machine-readable instructions stored on machine-readable storage media and executed by a processing resource of the tape library.

A tape cartridge can be loaded into or unloaded from a tape drive. Loading a tape cartridge into a tape drive allows a remote initiator (a user, a computing device, or another entity) to perform a read and write of the tape in the tape cartridge. A remote initiator refers to an entity that is separate from the tape library, but which may be able to access the tape library over a communication medium such as a wired network, wireless network, or another type of communication medium.

In some examples, the tape cartridges in a tape library are used to store backup data of a host system. The host system for which the tape cartridges are to store backup data can include a computing device or multiple computing devices. "Backup data" refers to data that is based on primary data in the host system, where the backup data can refer to a copy of the primary data or to any other data computed based on the primary data in from which the primary data can be recovered if the primary data were lost or corrupted for any reason. In other examples, tape cartridges in a tape library can be used to store archived data or other types of data.

A malware attack can attempt to remove or corrupt the primary data stored in a host system. In addition, the malware attack may also attempt to remove or corrupt the data stored in a backup system such as a tape library. An example of such a malware attack is a ransomware attack, in which an unauthorized entity (e.g., a user, a program, or a machine) encrypts the data in a host system as well as in a backup storage system such as a tape library. The encryption of the data in the host system and in the tape library can use an encryption key. Without the encryption key, the encrypted data is unrecoverable by users of the host system.

To prevent a malware attack such as a ransomware attack, a tape library can deny any requests to transport a tape cartridge between different destinations in the tape library unless the requests are received from authorized requesters.

Although reference is made to using a tape library for data backup, a tape library can store data for other purposes.

Also, although reference is made to a tape library in some examples, it is noted that techniques or mechanisms according to some implementations of the present disclosure can be applied to other types of storage systems that include storage cartridges that can be transported to storage drives for reading, writing, and initialization. "Transporting" a storage cartridge in a storage system refers to physically moving the storage cartridge between different physical locations in the storage system. An example of another type of storage system is a disk-based storage system or a solid state storage system in which a storage cartridge includes a disk-based storage cartridge or a solid state drive (SSD), respectively. A disk-based storage cartridge stores data on a rotatable medium, such as a magnetic medium or an optical medium. An SSD includes an integrated circuit memory device to store data.

In accordance with some implementations of the present disclosure, a computer (such as in a storage system or external of the storage system) receives a command to transport a storage cartridge in the storage system from a physical storage slot to a storage drive. The computer determines whether the storage cartridge is associated with a restricted transport indication set by a configuration operation in the storage system. In response to determining that the storage cartridge is associated with the restricted transport indication, the system checks for an indication of receipt of an access secret information and denies processing of the command to transport the storage cartridge if the indication of receipt of the access secret information is not present.

In some examples, "access secret information" can refer to a password, a certificate, a signature, or any other information that is "secret" (i.e., known to specified entities to perform an action, and intended to be undisclosed to entities other than the specified entities). An "indication of receipt of an access secret information" can refer to receipt of the access secret information itself, or can refer to receipt of other information that provides an indication that the access secret information may have been received previously. In the latter examples, the indication of receipt of an access secret information can include a token, session information (e.g., a session cookie), and so forth. A "token" can refer to any information element that when set to a specific value provides an indication of an event, such as the prior authentication of an entity based on provision of an access secret information by the entity. Session information refers to information that is stored as part of a session established between an entity and the storage system, where the session may have been established based on provision of access secret information by the entity.

Example Storage Arrangement

FIG. 1 is a block diagram of an example arrangement that includes a storage library 102 (e.g., a tape library or another type of storage library) that is accessible by a host system 104 (or by any of multiple host systems 104). Communications between the host systems 104 and the storage library 102 can occur over a network 103, such as a local area network (LAN), a wide area network (WAN), a storage area network (SAN), the Internet, and so forth. The network 103 can include a wired network and/or a wireless network.

A host system 104 includes a computing device (or multiple computing devices) that is (are) able to issue requests to access data stored in storage cartridges in the storage library 102. For example, a host system 104 can access data in storage cartridges of the storage library 102 as part of a data backup operation in which primary data stored by the host system 104 (or by another system) is copied to the storage library 102 to be stored in a storage cartridge (or multiple storage cartridges).

A host system 104 can also access data in storage cartridge(s) of the storage library 102 by reading the data of the storage cartridge(s), such as during a restore operation in which data stored by the storage cartridge(s) is copied back to the host system 104 or another system. The restore operation can be used to restore a corrupted or missing primary data.

In other examples, access of data stored in storage cartridge(s) of the storage library 102 can be part of other types of operations by the host system(s) 104.

In the example of FIG. 1, storage cartridges are divided into multiple partitions 1 through N (where N≥2). In other examples, the storage cartridges in the storage library 102 are not divided into multiple partitions. A "partition" refers to a subset of storage cartridges in the storage library 102 that are either physically or logically separated from another subset of storage cartridges in the storage library 102. The storage cartridges in the different partitions can be accessed by respective different host systems, or can be used to store different types of data, or for any other purpose.

In the example of FIG. 1, storage cartridges 106-1 are removably mounted in physical storage slots (or more simply "storage slots") 108-1 of partition 1. Similarly, storage cartridges 106-N are removably mounted in storage slots 108-N of partition N.

Note that a storage cartridge 106-$i$ (i=1 to N) can be removed from a corresponding storage slot 108-$i$ for transport by a transport device 110 to a different location in the storage library 102, such as to a storage drive 112-$i$ in partition i or to another storage slot in partition i. Each partition i can include a single storage drive 112-$i$ or multiple storage drives.

Although just one transport device 110 is shown in FIG. 1, in other examples, the storage library 102 can include multiple transport devices. A "transport device" can refer to any mechanism that can physically transport a storage cartridge between different locations in the storage library 102. Examples of transport devices include pickers, robots, grippers, carriages, and so forth.

In examples according to FIG. 1, the storage library 102 includes a storage interface 114 and a management interface 116 that is separate from the storage interface 114. The storage interface 114 is used to communicate data and control information between the storage library 102 and a host system 104. The data that is communicated through the storage interface 114 includes write data that is transmitted by a host system 104 to the storage library 102 to store in a storage cartridge, or read data that is retrieved from a storage cartridge and transmitted to a host system 104.

Control information that can be communicated through the storage interface 114 can include commands received from a host system 104 to perform a data access operation in the storage library 102, such as a write operation or a read operation. Additionally, the commands can include commands to determine a status of the storage library 102 (or a portion of storage library 102).

In some examples, the storage interface 114 is a Small Computer System Interface (SCSI) through which the storage library 102 is able to receive SCSI commands from a host system 104, and through which write or read data is exchanged.

In other examples, the storage interface 114 includes a Non-Volatile Memory Express (NVMe) interface through which NVMe commands and data can be exchanged.

In further examples, the storage interface 114 can be according to another protocol, whether standardized, proprietary, or open source.

The management interface 116 of the storage library 102 is separate from the storage interface 114, and provides a separate communications path between an external entity and the storage library 102. An "external entity" is an entity (e.g., a program, a machine, a human, etc.) that is external of the storage library 102. For example, the external entity can include a host system 104, an administrator system 105 (e.g., a computing system associated with an administrator for the storage library 102), and so forth.

The management interface 116 is used to perform various management tasks with respect to the storage library 102, including configurations of the storage library 102, monitoring of the storage library 102, and so forth. An example of the management interface 116 is a Representational State Transfer (REST) application programming interface (API), which can be used for providing web services (referred to as RESTful web services). A REST API supports various routines (also referred to as methods) and rules defining how an external entity is to interact with the storage library 102 through the management interface 116.

In further examples, the storage library 102 can also include an administrator interface 117, which can be referred to as a remote management interface (RMI) in some examples. The administrator interface 117 which can be in the form of a dedicated website that is accessible by authorized persons (e.g., an administrator using the administrator system 105) to perform configurations of the storage library 102. When the website presented by the administrator interface 117 is accessed by a system such as the administrator system 105, a web-based user interface may be presented at the administrator system 105, such as in a web browser. An administrator can use the web-based user interface to perform management tasks with respect to the storage library 102.

Although referred to as an "administrator interface," the administrator interface 117 can be considered a management interface, except of a form different from the management interface 116. Either the administrator interface 117 or the management interface 116 can be used to initiate a configuration operation in the storage library 102.

The storage library 102 also includes a restricted transport control engine 118, which controls whether or not a transport of a storage cartridge 106 in the storage library 102 is allowed in response to a command (120) to transport a storage cartridge received from a host system 104 (or from another system such as the administrator system 105) over the network 103.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The storage library 102 includes a memory 122, which can be implemented using a memory device or multiple memory devices. A memory device can include a dynamic random access memory (DRAM) device, a static random access memory (SRAM) device, a flash memory device, or any other type of memory device.

The memory 122 can store information, including indications 124-1 to 124-N associated with respective partitions 1 to N. The indications 124-1 to 124-N are restricted transport indications (RTIs), which are set during a configuration operation of the storage library 102. The configuration operation can be initiated by the administrator system 105, by a host system 104, or by another system.

In examples according to FIG. 1, the RTI 124-1 is associated with partition 1, such that any storage cartridges 106-1 in partition 1 are restricted transport storage cartridges. Similarly, the RTI 124-N is associated with partition N, such that any storage cartridges 106-N in partition N are restricted transport storage cartridges.

A "restricted transport storage cartridge" refers to a storage cartridge whose transport (such as by the transport device 110) within the storage library 102 in response to a command (e.g., 120) from outside the storage library 102 is subject to restricted transport handling (discussed further below).

In other examples, instead of associating RTIs with respective partitions in the storage library 102, RTIs can be associated with individual storage cartridges (i.e., one RTI per individual storage cartridge) or can be associated with a different subset of storage cartridges.

An RTI can refer to any type of indicator (in the form of a flag, a variable or parameter, or any other information element) that can be set to any of multiple different values (e.g., "0" and "1"). An RTI corresponds to the indicator being set to a first value. If the indicator is set to a second value different from the first value, then the RTI is not set for the corresponding storage cartridge, partition, or other subset of storage cartridges.

FIG. 1 also shows an indication 126 stored in the memory 122. The indication 126 is an indication of receipt of an access secret information associated with a command (e.g., 120) to transport a storage cartridge. The indication 126 can be referred to as an access secret indication (ASI). Although just one ASI is shown in FIG. 1, it is noted that the memory 122 may store multiple ASIs indicating receipt of access secret information from multiple external entities and/or for different partitions.

The ASI 126 can include the access secret information itself, or the ASI 126 can include information indicating a prior authentication of a source of a command to transport a storage cartridge. In the latter examples, the ASI 126 can be in the form of a token, session information (e.g., a session cookie), and so forth. A token can refer to any information element that when set to a specific value provides an indication of an event, such as the prior authentication of a source of a command to transport a storage cartridge. Session information refers to information that is stored as part of a session established between an external entity and the storage library 102. For example, when the external entity logs into the storage library 102 through the management interface 116, based on submission by the external entity of a credential for the management interface 116, the session information can be created that indicates the successful login by the external entity. The successful login constitutes a prior authentication of the external entity, which may subsequently issue the command (120) to transport a storage cartridge.

The ASI 126 is set if a received access secret information matches access secret information stored for the storage cartridge or for a partition containing the storage cartridge. The ASI 126 is set if a received access secret information matches access secret information stored by the storage library 102 for the storage cartridge or for a partition containing the storage cartridge. For example, access secret information for respective different partitions or different storage cartridges can be stored in the memory 122 (or another memory) for comparison to received access secret information.

For example, the ASI 126 can include an indicator that is settable to a first value to represent that the received access secret information matches access secret information stored by the storage library 102 for the storage cartridge or for a partition containing the storage cartridge, and to a different second value to present that the received access secret information does not access secret information stored by the storage library 102 for the storage cartridge or for a partition containing the storage cartridge. The indicator can be in the form of a flag or parameter or in session information or in a token, as examples.

Multiple different access secret information can be stored by the storage library 102 for respective storage cartridges or respective partitions. The multiple access secret information may be provided to the storage library 102 by the administrator system 105, for example, such as through the administrator interface 117.

The storage library 102 also includes a controller 115 that controls operations within the storage library 102. The controller 115 can include a hardware processing circuit, which can include any or some combination of a microprocessor, a core of a multi-core microprocessor, a microcontroller, a programmable integrated circuit, a programmable gate array, or another hardware processing circuit.

In some examples, the controller 115 can process any of various commands received through the storage interface 114, and the controller 115 performs corresponding actions in response to the commands. For example, the controller 115 can command the transport device 110 to transport a storage cartridge 106-i from a storage slot 108-i to a storage drive 112, and to cause loading of the storage cartridge 106-i into the storage drive 112. As a further example, the controller 115 can cause a storage cartridge 106-i to be unloaded from a storage drive 112 and transported to a storage slot 108-i.

Although FIG. 1 shows the restricted transport control engine 118 being separate from the controller 115, in other examples, the restricted transport control engine 118 can be part of the controller 115.

Restricted Transport Handling

Figure 2:
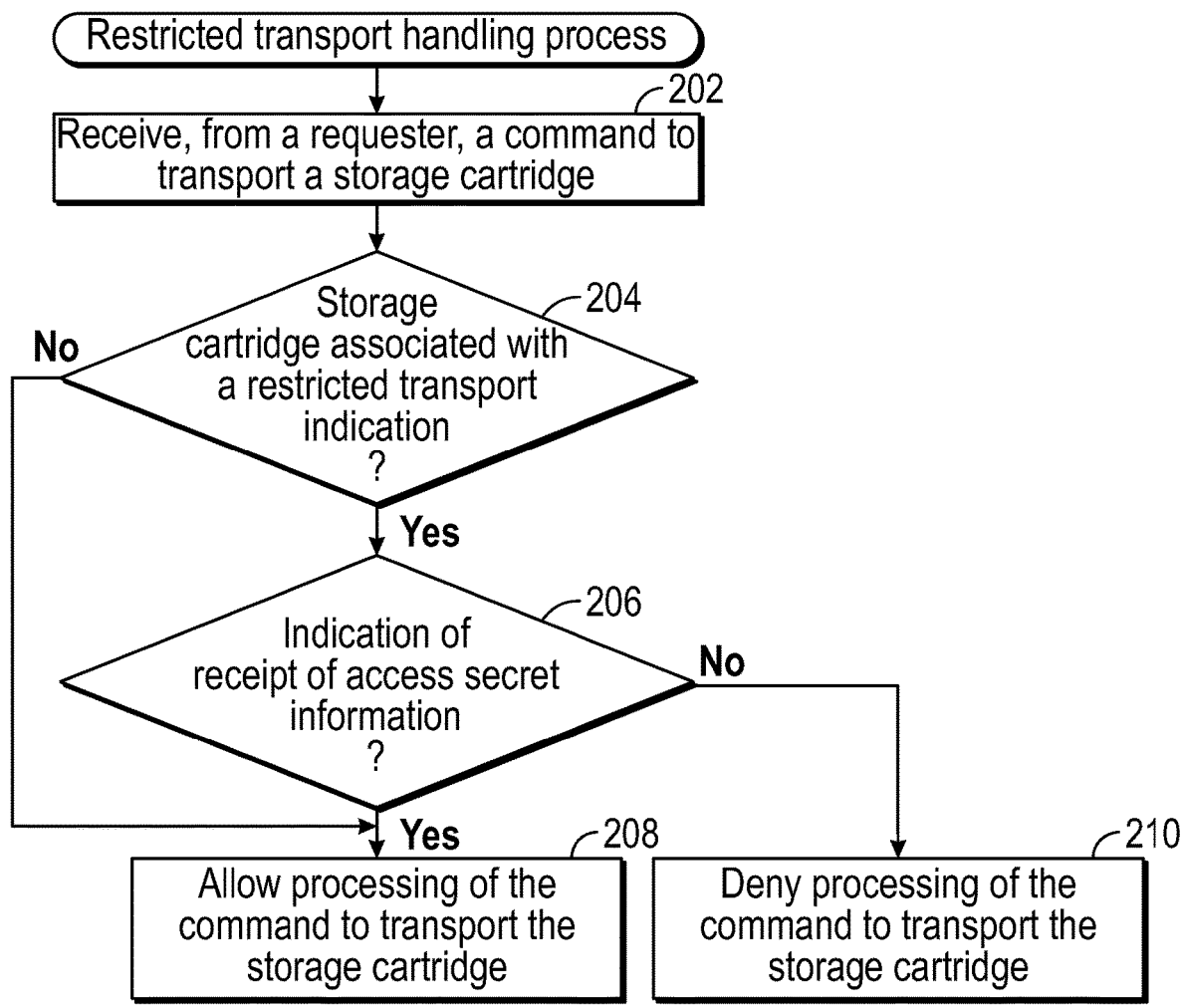
FIGS. 2-7 are flow diagrams of various processes according some examples.

FIG. 2 is a flow diagram of a restricted transport handling process that can be performed by the restricted transport control engine 118 according to some examples. The restricted transport control engine 118 receives (at 202), from a requester (e.g., an external entity such as a host system 104 in FIG. 1), a command (e.g., 120 in FIG. 1) to transport a storage cartridge in a storage system (e.g., the storage library 102 of FIG. 1) from a storage slot (108-1 or 108-N in FIG. 1) to a storage drive (e.g., 112 in FIG. 1). The command can be received through the storage interface 114 or through the management interface 116.

The restricted transport control engine 118 determines (at 204) whether the storage cartridge is associated with a restricted transport indication (e.g., the RTI 124-1 or 124-N in FIG. 1) set by a configuration operation in the storage system.

In response to determining (at 204) that the storage cartridge is associated with the restricted transport indication, the restricted transport control engine 118 checks (at 206) for an indication of receipt of an access secret information (e.g., the ASI 126 in FIG. 1) from the requester.

The restricted transport control engine 118 allows (at 208) processing of the command to transport the storage cartridge if the indication of receipt of the access secret information from the requester is present.

On the other hand, the restricted transport control engine 118 denies (at 210) processing of the command to transport the storage cartridge if the indication of receipt of the access secret information from the requester is not present.

In response to determining (at 204) that the storage cartridge is not associated with the restricted transport indication, the restricted transport control engine 118 allows (at 208) processing of the command to transport the storage cartridge.

The restricted transport control engine 118 provides control information (119 in FIG. 1) to the controller 115 based on whether or not processing of the command to transport the storage cartridge is allowed or denied. If the restricted transport control engine 118 indicates in the control information that the command to transport is denied, then the controller 115 does not process the command to transport a storage cartridge. However, if the restricted transport control engine 118 indicates in the control information that the command to transport is allowed, then the controller 115 can process the command to transport a storage cartridge by controlling the transport device 110. The control information can be in the form of a signal, a message, or any other type of information.

Further examples of restricted transport handling are discussed further below in connection with FIGS. 4-6.

Configuring Restricted Transport Storage Cartridges

Figure 3:
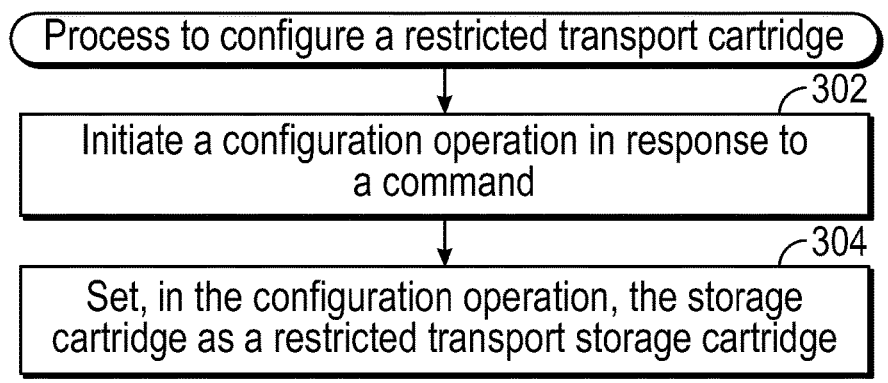

FIG. 3 is a flow diagram of a process of configuring a restricted transport storage cartridge. The process of FIG. 3 includes initiating (at 302) a configuration operation in response to a command from the administrator system 105, a host system 104, or another system. The command can be received through the administrator interface 117, the management interface 116, or the storage interface 114. In some examples, prior to initiating the configuration operation, an authentication operation can be performed to confirm that the source of the command is authorized to make the requested configuration change.

The process of FIG. 3 includes setting (at 304), in the configuration operation, a storage cartridge as a restricted transport storage cartridge. Note that setting a storage cartridge as a restricted transport storage cartridge can involve individually setting the storage cartridge as a restricted transport storage cartridge, or can be part of setting a group of storage cartridges as restricted transport storage cartridges (e.g., a partition shown in FIG. 1).

Various different configuration techniques can be used to set a storage cartridge as a restricted transport storage cartridge in a configuration operation. In some examples, a configuration operation to configure a storage cartridge as a restricted transport storage cartridge can use a command passed through the storage interface 114 of the storage library 102. The command can be issued from the administrator system 105 or from a host system 104. A storage cartridge configured as a restricted transport storage cartridge can be indicated by setting a respective RTI 124-i in the memory 122.

As an example, the command to configure a storage cartridge as a restricted transport storage cartridge can be a configuration command that is used to perform a configuration operation in the storage library 102. Note that the configuration command does not cause transport of a storage cartridge in the storage library 102, or does not cause access of data in a storage cartridge in the storage library 102, or does not cause another operation in the storage library 102 that is different from the configuration operation.

The configuration command can be a new SCSI command or a new NVMe command. A "new" SCSI command refers to a command that is not yet specified by current SCSI standards, but which may or may not be specified by future SCSI standards. Similarly, a "new" NVMe command refers to a command that is not yet specified by current NVMe standards, but which may or may not be specified by future NVMe standards. More generally, a "new" command refers to a command that is not yet specified by current standards for the storage interface 114, but which may or may not be specified by future standards for the storage interface 114.

In further examples, the configuration command to configure a storage cartridge as a restricted transport storage cartridge can include an existing command extended to add a new information element (e.g., a parameter) that can be set to a specified value to indicate a restricted transport mode. An "existing" SCSI command refers to a command that is present in current SCSI standards. However, the new information element is not specified by the current SCSI standards, but may or may not be specified by future SCSI standards. Similarly, an "existing" NVMe command refers to a command that is present in current NVMe standards. However, the new information element is not specified by the current SCSI standards, but may or may not be specified by future NVMe standards. More generally, an "existing" command refers to a command that is present in current standards for the storage interface 114. A new information element is not specified in the current standards for the storage interface 114, but may or may not be specified by future standards for the storage interface 114.

An example of an existing SCSI configuration command with a new information element can be a SEND VOLUME TAG command. The SEND VOLUME TAG command associates a label with a storage cartridge identified in the command. In some examples, a new information element added to the SEND VOLUME TAG command can be set to a value to indicate that the storage cartridge is a restricted transport storage cartridge, which causes setting of the corresponding RTI 124-$i$ in the memory 122. In other examples, other existing SCSI configuration commands or other existing NVMe configuration commands can be employed that are extended with a new information element to indicate that a storage cartridge is a restricted transport storage cartridge.

In further examples, instead of using a configuration command, a command to configure a storage cartridge as a restricted transport storage cartridge can include a storage cartridge manipulation command, such as a command to transport a storage cartridge. More generally, a "storage cartridge manipulation command" can refer to any command that can cause an operation to be performed with respect to a storage cartridge, such as a transport, a read, a write, and so forth.

The storage cartridge manipulation command that can be used to configure a storage cartridge as a restricted transport storage cartridge can be a new storage cartridge manipulation command or an existing storage cartridge manipulation command extended to add a new information element. For example, an existing storage cartridge manipulation command can be a SCSI MOVE MEDIUM command, which is used to transport a storage cartridge for loading or unloading with respect to a storage drive. The SCSI MOVE MEDIUM command can be extended with a new information element to set the storage cartridge that is being transported as a restricted transport storage cartridge, which can be indicated by setting a respective RTI 124-$i$ in the memory 122. In other examples, other existing SCSI storage cartridge manipulation commands or other existing NVMe storage cartridge manipulation commands can be employed.

In an example, a host system 104 may determine that a specific storage cartridge is to be protected after a job is completed on the given storage cartridge (e.g., a write has completed to the given storage cartridge). The job includes submitting a SCSI MOVE COMMAND to move the given storage cartridge to a storage drive to perform the write. In the same SCSI MOVE COMMAND, the host system 104 can set the new information element to specify that the given storage cartridge is a restricted transport storage cartridge.

In another example, configuring a storage cartridge as a restricted transport storage cartridge can use a combination of a configuration command and an existing storage cartridge manipulation command. For example, a configuration command may be issued to specify that a given storage cartridge is to be set as a restricted transport storage cartridge upon transport of the given storage cartridge out of a storage drive in response to a subsequently issued storage cartridge manipulation command.

In further examples, a configuration operation to configure a storage cartridge as a restricted transport storage cartridge can be part of configuring a partition in the storage library 102 as a restricted transport partition. A respective RTI 124-$i$ can be set in the memory 122 for the restricted transport partition. Any storage cartridge present in a storage slot of the restricted transport partition is treated as a restricted transport storage cartridge; in other words, a command to transport a storage cartridge in the restricted transport partition would be processed by the restricted transport control engine 118 to determine whether or not the command is allowed or denied (such as according to FIG. 2).

In some examples, a partition can be set as a restricted transport partition by an administrator at the administrator system 105, which can access the storage library 102 through the administrator interface 117 of the storage library 102. For example, the administrator system 105 can connect to the administrator interface 117 of the storage library 102, and once connected, the administrator system 105 can present a user interface that allows the administrator at the administrator system 105 to perform a configuration of the storage library 102.

In other examples, a command to set a partition of the storage library 102 as a restricted transport partition can be provided through the storage interface 114. The command can include a new SCSI command, an existing SCSI command extended with a new information element, a new NVMe command, an existing NVMe command extended with a new information element, and so forth. In other examples, the command to set a partition of the storage library 102 as a restricted transport partition can be provided through the management interface 116.

Restricted Transport Handling-Further Examples

Figure 4:
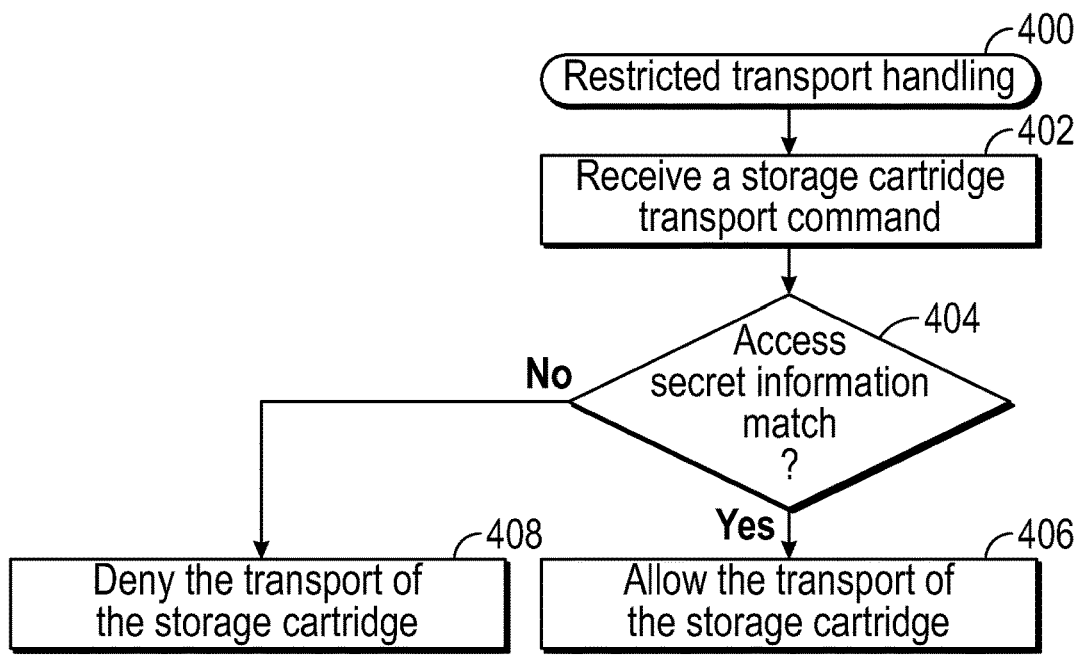

FIG. 4 is a flow diagram for performing a restricted transport handling process 400 for a storage cartridge according to some examples. The process 400 assumes that the storage cartridge is a restricted transport storage cartridge (e.g., the RTI for the storage cartridge is set).

The restricted transport control engine 118 (FIG. 1) receives (at 402) a storage cartridge transport command that includes an information element that carries access secret information (e.g., a password, a signature, a certificate, etc.). The received storage cartridge transport command is a command to transport the storage cartridge.

The restricted transport control engine 118 determines (at 404) whether the access secret information in the received command matches a stored access secret information, which can be stored in the memory 122 or another memory, for example. If there is a match, the restricted transport control engine 118 allows (at 406) the transport of the storage cartridge in response to the received command. However, if the access secret information in the received command does not match the stored access secret information, the restricted transport control engine 118 denies (at 408) transport of the storage cartridge.

Figure 5:
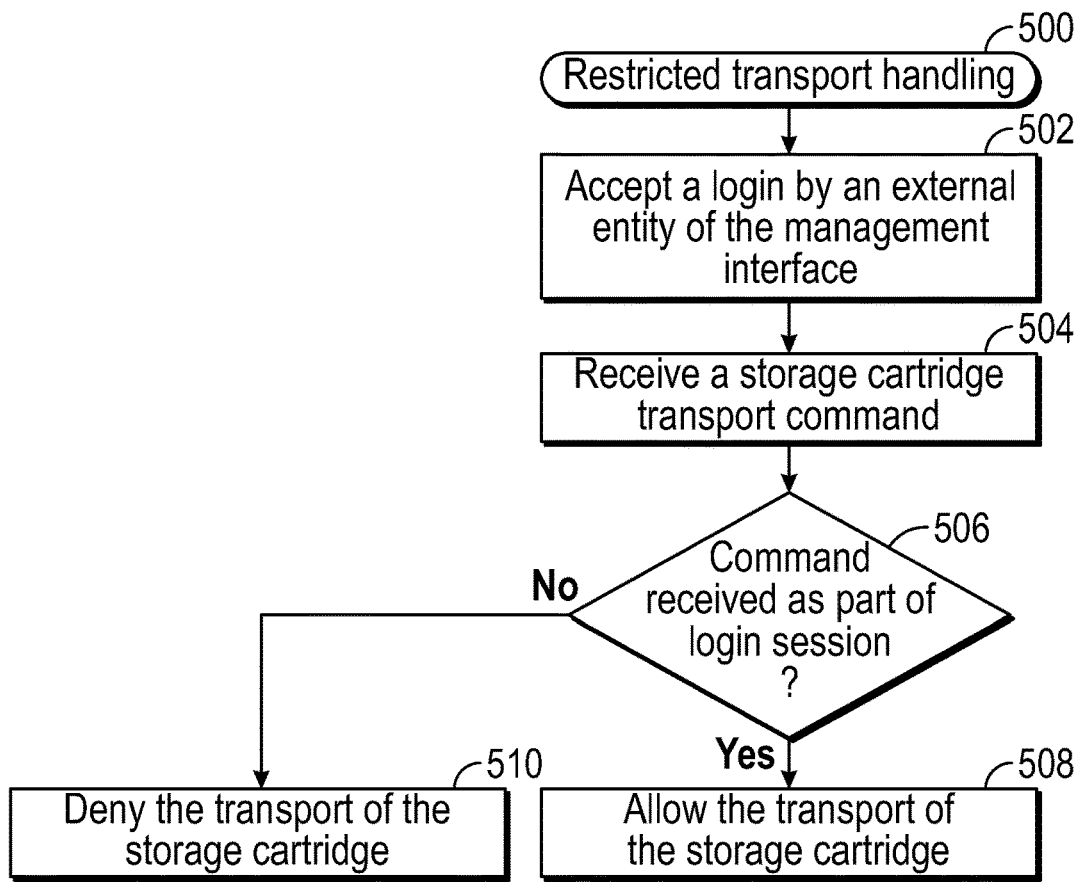

FIG. 5 is a flow diagram of a restricted transport handling process 500 according to further examples. The process 500 assumes that the storage cartridge is a restricted transport storage cartridge (e.g., the RTI for the storage cartridge is set).

The process 500 uses an out-of-band interface for storage cartridge transport commands. An "out-of-band interface" is an interface that is separate from the storage interface 114 of FIG. 1, which is considered an in-band interface that is used to communicate storage commands and data. In some examples, the out-of-band interface includes the management interface 116 of FIG. 1, such as a REST API. An out-of-band interface can be connected to a different computer than a host system (e.g., 104 in FIG. 1) connected to the storage interface 114.

In such examples, authorization to perform a transport of a storage cartridge is based on authentication in the out-of-band interface, such as the management interface 116. This is contrasted with authentication that uses the in-band interface of the storage library 102 (i.e., the storage interface 114) depicted in FIG. 4, where the access secret information is provided with a command to transport a storage cartridge.

In the restricted transport handling process 500, the storage library 102 accepts (at 502) a login by an external entity of the management interface 116. The external entity can be a host system 104, for example. A login session with the management interface 116 is successfully established in response to the external entity submitting a login credential (e.g., a username and password or other credential such as a certificate or signature) to the management interface 116. In the restricted transport handling process 500, the login credential for the management interface 116 is the access secret information.

The restricted transport control engine 118 receives (at 504), from the external entity, a storage cartridge transport command to transport a storage cartridge.

The restricted transport control engine 118 determines (at 506) whether the storage cartridge transport command is received as part of the login session with the management interface 116, which provides implicit authorization that the storage cartridge transport command is permissible. The session information for the login session is considered the ASI in the FIG. 5 example.

If the storage cartridge transport command is received as part of the login session with the management interface 116, the restricted transport control engine 118 allows (at 508) transport of the storage cartridge. If the storage cartridge transport command is not received as part of the login session with the management interface 116, the restricted transport control engine 118 denies (at 510) the transport of the storage cartridge.

Figure 6:
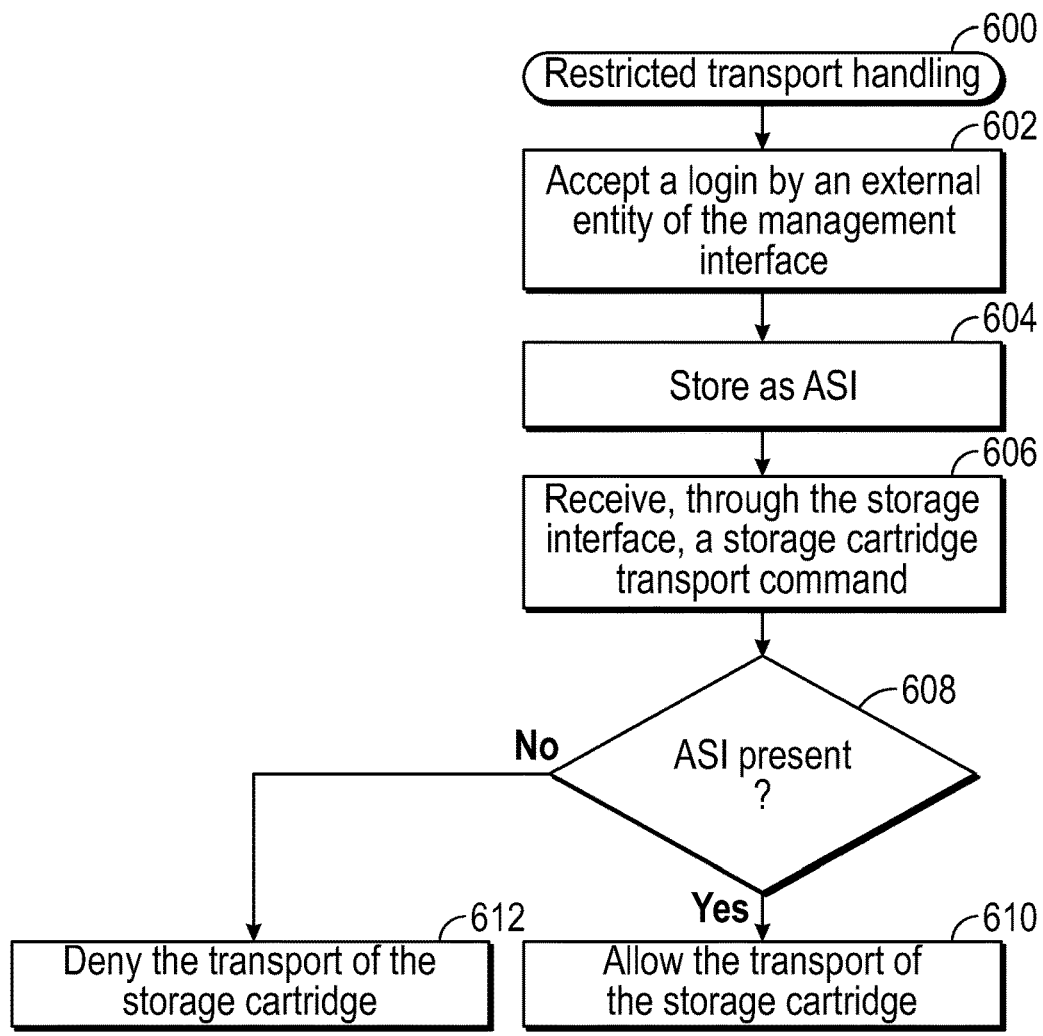

FIG. 6 is a flow diagram of a restricted transport handling process 600 according to further examples. The process 600 assumes that the storage cartridge is a restricted transport storage cartridge (e.g., the RTI for the storage cartridge is set).

As is the case with the restricted transport handling process 500 of FIG. 5, the restricted transport handling process 600 of FIG. 6 uses an out-of-band interface (e.g., the management interface 116) for authenticating whether a requester that is requesting a storage cartridge transport is authorized to do so. However, in FIG. 6, instead of using the out-of-band interface also to receive a storage cartridge transport command, the in-band interface (e.g., the storage interface 114) is used instead to receive a storage cartridge transport command.

In the restricted transport handling process 600, the storage library 102 accepts (at 602) a login by an external entity of the management interface 116. The external entity can be a host system 104, for example. As a result of a successful login session with the management interface 116 by the external entity, the storage library 102 stores (at 604) an ASI (in a session cookie, for example) for the external entity.

Subsequently, the restricted transport control engine 118 receives (at 606), from the external entity through the storage interface 114, a storage cartridge transport command to transport a storage cartridge.

The restricted transport control engine 118 checks (at 608) for the ASI (e.g., in the session cookie) to determine whether the external entity is authorized to request the storage cartridge transport. If the ASI is present, the restricted transport control engine 118 allows (at 610) transport of the storage cartridge. If the ASI is not present, the restricted transport control engine 118 denies (at 612) the transport of the storage cartridge.

In additional examples, the restricted transport control engine 118 can perform a two-level check to determine whether a storage cartridge transport command is allowed. For example, the restricted transport control engine 118 can check, at a first level, that a login was successfully established by an external entity with the management interface 116. The restricted transport control engine 118 can also check, at a second level, that the external entity also provided a separate access secret information for the storage cartridge, either through the management interface 116 or through the storage interface 114. The separate access secret information can be for the individual storage cartridge, or for a partition in which the storage cartridge is located. The storage cartridge transport command is allowed if both the check at the first level and the check at the second level was successful. The storage cartridge transport command is denied if either the check at the first level or the check at the second level failed.

Reporting Restricted Transport Status

After a storage cartridge has been configured as a restricted transport storage cartridge, a requester, such as a host system 104, can request a status of the restricted transport storage cartridge.

Figure 7:
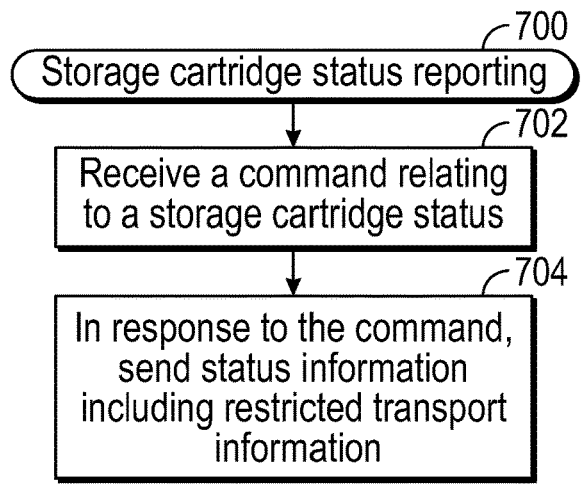

FIG. 7 is a flow diagram of a storage cartridge status reporting process 700 according to some examples. The storage library 102 receives (at 702), from a requester (e.g., a host system 104 or the administrator system 105) a command relating to a storage cartridge status. The command can be received through any of the storage interface 114, the management interface 116, or the administrator interface 117. The command can be a command specifically calling for status information of a storage cartridge or a group of storage cartridges (e.g., a partition). Alternatively, the command can be a command to transport a storage cartridge, which can trigger a status report.

In response to the command relating to a storage cartridge status, the storage library 102 sends (at 704) status information for a storage cartridge. The status information can include restricted transport information indicating whether or not the storage cartridge is a restricted transport storage cartridge. For example, the restricted transport information can include an indicator that if set to a first value indicates that the storage cartridge is a restricted transport storage cartridge, and if set to a different second value indicates that the storage cartridge is not a restricted transport storage cartridge.

In other examples, the status information can indicate whether or not a partition or another group of storage cartridges is a restricted transport partition/group.

In some examples, the status information can include a SCSI READ ELEMENT STATUS message. The READ ELEMENT STATUS message has bytes (an example of the restricted transport information noted above) that can be used for reporting additional information, and the definition of the meaning of the additional information is customizable (such as by the manufacturer of the storage library 102).

Alternatively, the READ ELEMENT STATUS message includes a field that reports that a storage library is not able to access a storage slot in the storage library. This field can be used alone or in combination with reporting in additional bytes of the READ ELEMENT STATUS message.

ADDITIONAL EXAMPLES

Figure 8:
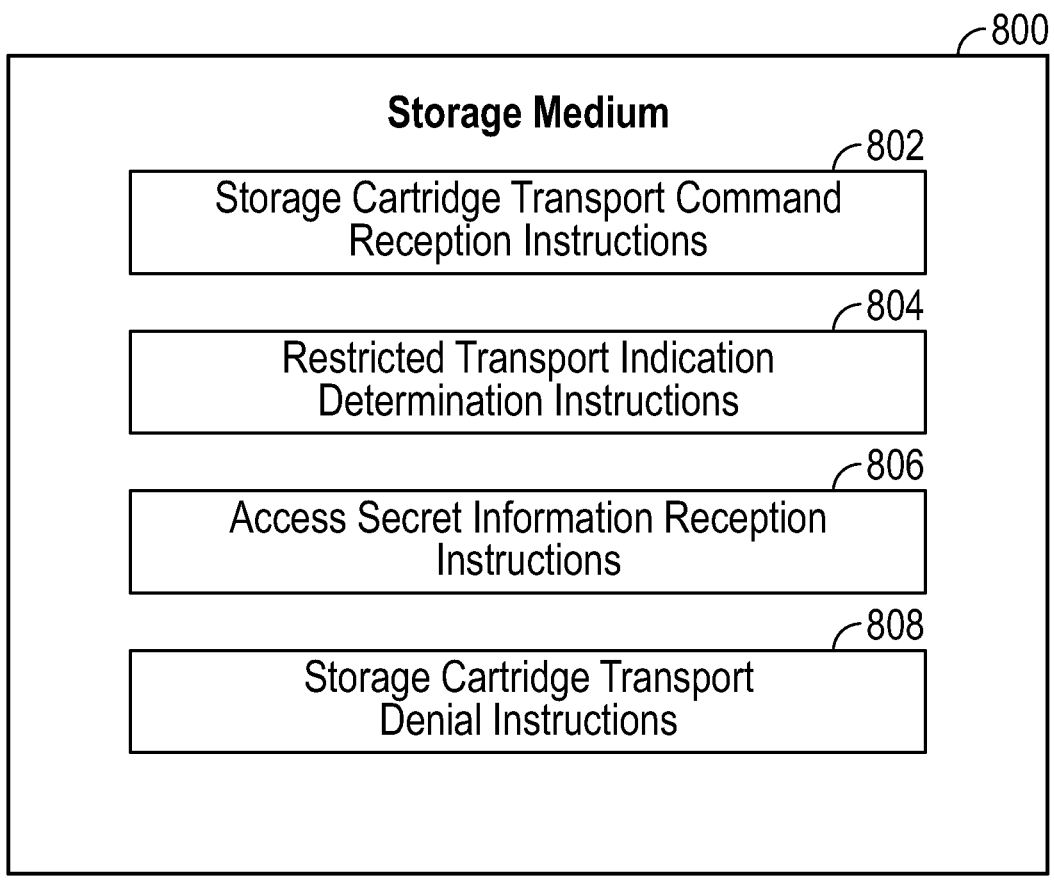
FIG. 8 is a block diagram of a storage medium storing machine-readable instructions according to some examples.

FIG. 8 is a block diagram of a non-transitory machine-readable or computer-readable storage medium 800 storing machine-readable instructions that upon execution cause a computer to perform various actions. The computer can include a processing resource (including a processor or multiple processors) of a storage system (e.g., the storage library 102 in FIG. 1), or can be separate from the storage system.

The machine-readable instructions include storage cartridge transport command reception instructions 802 to receive a command to transport a storage cartridge in a storage system from a physical storage slot to a storage drive. In some examples, the command is received through a storage interface of the storage system. In other examples, the command is received through a management interface of the storage system.

The machine-readable instructions include restricted transport indication determination instructions 804 to determine whether the storage cartridge is associated with a restricted transport indication set by a configuration operation in the storage system.

The machine-readable instructions include access secret information reception instructions 806 to, in response to determining that the storage cartridge is associated with the restricted transport indication, check for an indication of receipt of an access secret information. In some examples, the access secret information is included in the command. In other examples, the access secret information is to obtain access of the management interface; for example, the access secret information can include login information to log into the management interface. In further examples, the indication of receipt of the access secret information includes information indicating a prior authentication of a source of the command (e.g., the access secret information can be stored in a token or session information in response to the prior authentication). For example, the session information is created responsive to a login by a requester of the management interface for the storage system, and the command to transport the storage cartridge is received through a storage interface of the storage system. As another example, the token is received in association with the command, where the token is to provide an indication that a source of the command previously submitted a credential that authenticated the source.

The machine-readable instructions include storage cartridge transport denial instructions 808 to deny processing of the command to transport the storage cartridge if the indication of receipt of the access secret information is not present.

Figure 9:
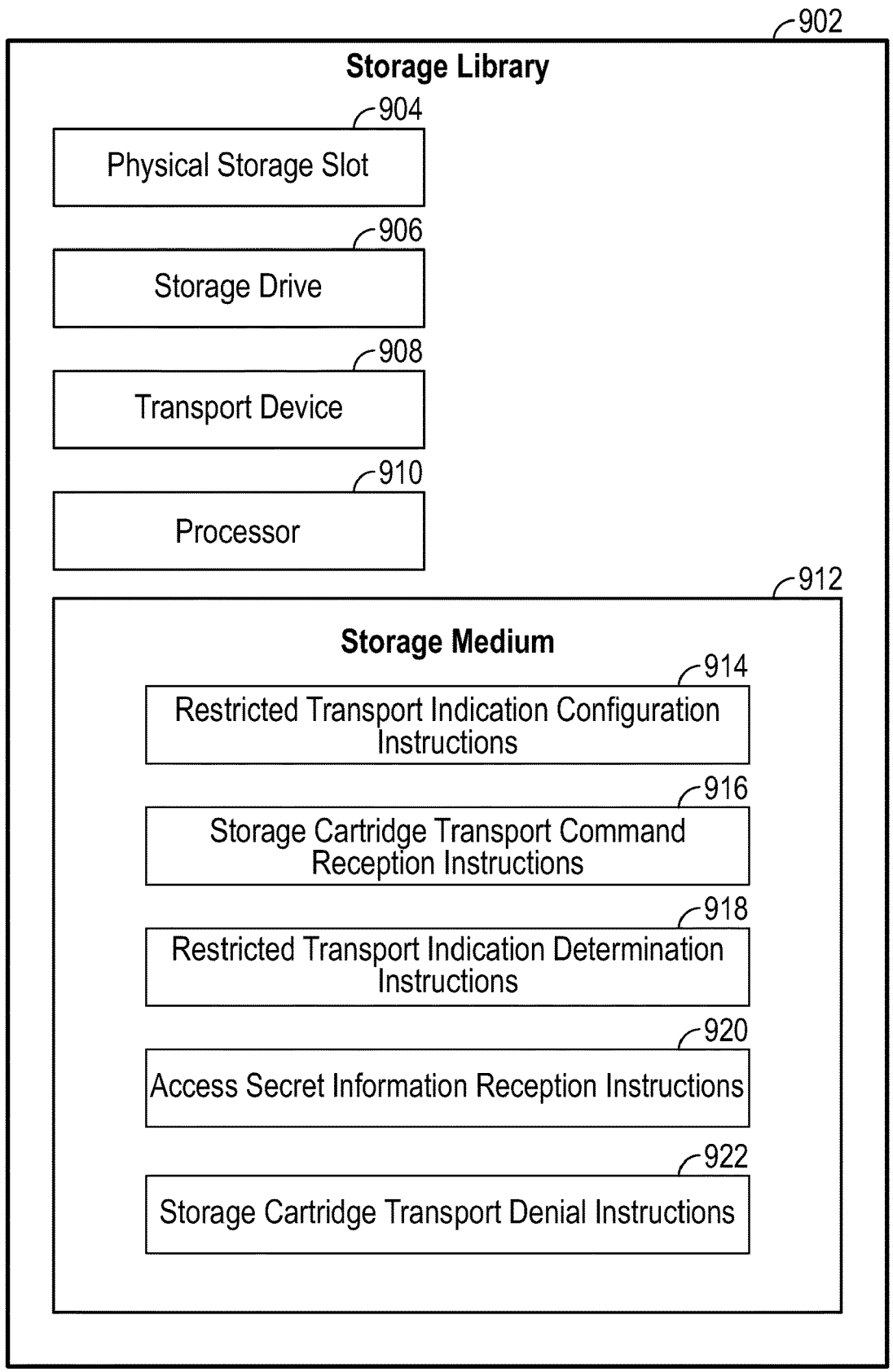
FIG. 9 is a block diagram of a storage library according to some examples.

FIG. 9 is a block diagram of a storage library 902 that includes a physical storage slot 904, a storage drive 906, and a transport device 908 to transport storage cartridges between different locations in the storage library 902.

The storage library 902 further includes a processor 910 (or multiple processors). A processor can include a microprocessor, a core of a multi-core microprocessor, a microcontroller, a programmable integrated circuit, a programmable gate array, or another hardware processing circuit.

The storage library 902 further includes a non-transitory storage medium 912 storing machine-readable instructions executable on the processor 910 to perform various tasks. Machine-readable instructions executable on a hardware processor can refer to the instructions executable on a single hardware processor or the instructions executable on multiple hardware processors.

The machine-readable instructions in the storage medium 912 include restricted transport indication configuration instructions 914 to configure, in a configuration operation, a restricted transport indication with a storage cartridge in the storage library.

The machine-readable instructions in the storage medium 912 include storage cartridge transport command reception instructions 916 to receive a command to transport the storage cartridge from the physical storage slot to the storage drive.

The machine-readable instructions in the storage medium 912 include restricted transport indication determination instructions 918 to determine whether the storage cartridge is associated with the restricted transport indication set by the configuration operation.

The machine-readable instructions in the storage medium 912 include access secret information reception instructions 920 to, in response to determining that the storage cartridge is associated with the restricted transport indication, check for an indication of receipt of an access secret information.

The machine-readable instructions in the storage medium 912 include storage cartridge transport denial instructions 922 to deny processing of the command to transport the storage cartridge if the indication of receipt of the access secret information is not present.

Figure 10:
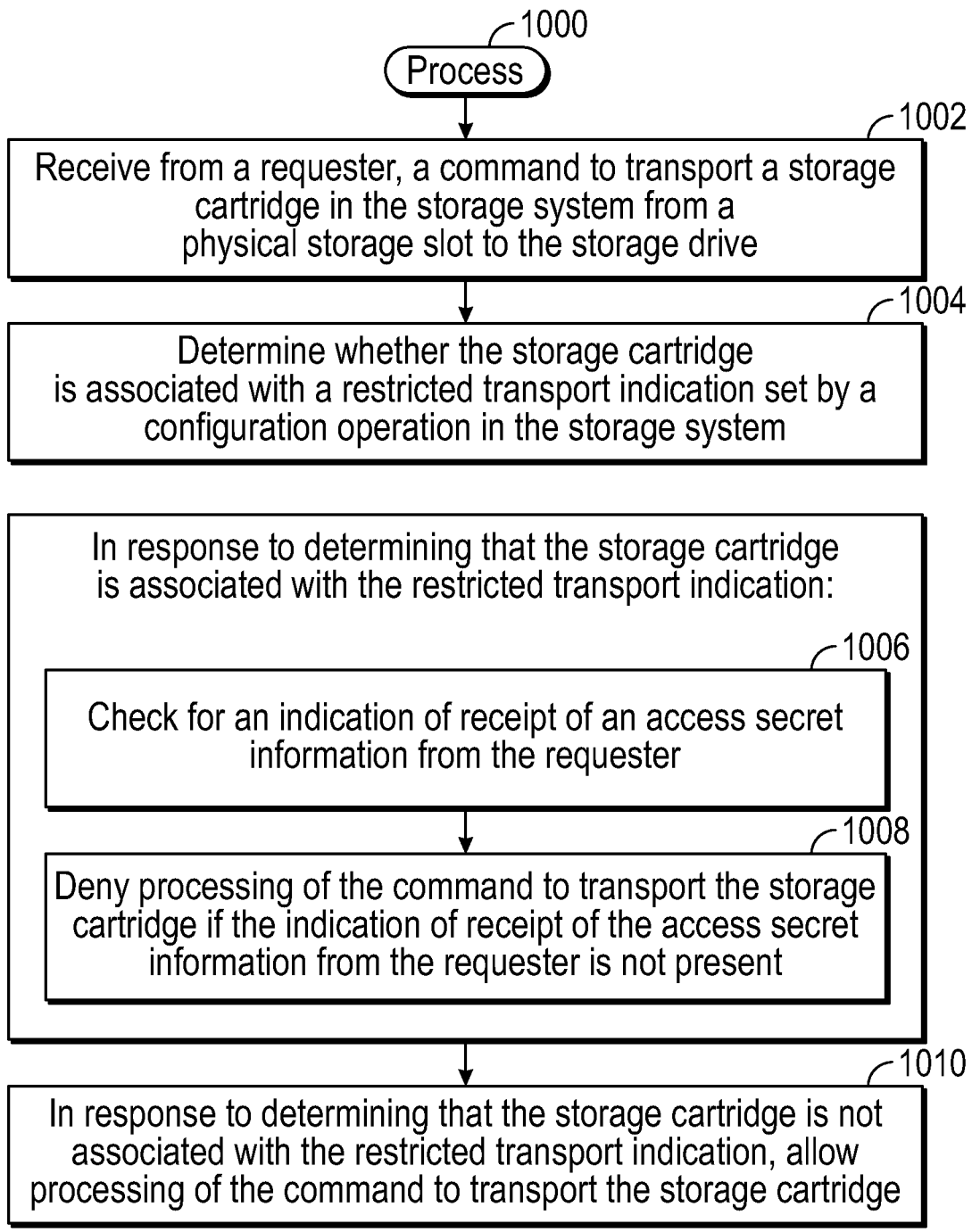
FIG. 10 is a flow diagram of a process according to some examples.

FIG. 10 is a flow diagram of a process 1000 of a storage system, such as the storage library 102 of FIG. 1.

The process 1000 includes receiving (at 1002), from a requester, a command to transport a storage cartridge in the storage system from a physical storage slot to the storage drive.

The process 1000 includes determining (at 1004) whether the storage cartridge is associated with a restricted transport indication set by a configuration operation in the storage system.

In response to determining that the storage cartridge is associated with the restricted transport indication, the process 1000 checks (at 1006) for an indication of receipt of an access secret information from the requester, and denies (at 1008) processing of the command to transport the storage cartridge if the indication of receipt of the access secret information from the requester is not present.

In response to determining that the storage cartridge is not associated with the restricted transport indication, the process 1000 allows (at 1010) processing of the command to transport the storage cartridge.

A storage medium (e.g., 800 in FIG. 8 or 904 in FIG. 9) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a computer to:
as part of a configuration operation, receive a configuration command comprising an information element set to a value indicating that a storage cartridge in a storage system has a restricted transport mode, wherein the configuration command is to configure the storage cartridge and the information element set to the value in the configuration command specifies that the storage cartridge is a restricted transport storage cartridge whose transport within the storage system in response to a command from outside the storage system is subject to restricted transport handling, and wherein the configuration command is a Small Computer System Interface (SCSI) configuration command or a Non-Volatile Memory Express configuration command;
in response to the configuration command comprising the information element set to the value specifying that the storage cartridge is the restricted transport storage cartridge, store, in a memory, a restricted transport indication in association with the storage cartridge;
receive a second command to transport the storage cartridge from a physical storage slot to a storage drive;
determine whether the storage cartridge is associated with the restricted transport indication in the memory set by the configuration operation in response to the configuration command; and
in response to determining that the storage cartridge is associated with the restricted transport indication, check for an indication of receipt of an access secret information and deny processing of the second command to transport the storage cartridge responsive to determining that the indication of receipt of the access secret information is not present.

2. The non-transitory machine-readable storage medium of claim 1, wherein the configuration command does not cause transport of the storage cartridge.

3. The non-transitory machine-readable storage medium of claim 1, wherein the configuration command does not cause access of data in the storage cartridge.

4. The non-transitory machine-readable storage medium of claim 1, wherein the restricted transport indication comprises a flag set to a first value, and wherein the memory stores a flag set to a different second value that indicates that another storage cartridge is not a restricted transport storage cartridge.

5. The non-transitory machine-readable storage medium of claim 1, wherein the instructions upon execution cause the computer to:
receive a command relating to a status of the storage cartridge; and
responsive to the command relating to the status of the storage cartridge, send a response including information indicating that the storage cartridge is the restricted transport storage cartridge.

6. The non-transitory machine-readable storage medium of claim 1, wherein the access secret information is included in the second command.

7. The non-transitory machine-readable storage medium of claim 6, wherein the second command is a SCSI command or a Non-Volatile Memory Express command, and the access secret information is included in a field of the SCSI command or the Non-Volatile Memory Express command.

8. The non-transitory machine-readable storage medium of claim 1, wherein the second command is received through a management interface of the storage system.

9. The non-transitory machine-readable storage medium of claim 8, wherein the access secret information is to obtain access of the management interface.

10. The non-transitory machine-readable storage medium of claim 9, wherein the access secret information comprises login information of the management interface to login to the management interface.

11. The non-transitory machine-readable storage medium of claim 1, wherein the indication of receipt of the access secret information comprises information indicating a prior authentication of a source of the second command.

12. The non-transitory machine-readable storage medium of claim 11, wherein the information indicating the prior authentication comprises session information, and wherein the instructions upon execution cause the computer to:
create the session information responsive to a login by a requester of a management interface for the storage system; and
receive the second command through a storage interface of the storage system, the storage interface being separate from the management interface.

13. The non-transitory machine-readable storage medium of claim 11, wherein the information indicating the prior authentication comprises a token, and wherein the instructions upon execution cause the computer to:
receive the token in association with the second command, the token to provide an indication that the source of the second command previously submitted a credential that authenticated the source.

14. The non-transitory machine-readable storage medium of claim 1, wherein the access secret information is for a first partition of a plurality of partitions of the storage system comprising storage cartridges, wherein each partition of the plurality of partitions comprises a subset of the storage cartridges, and the access secret information for the first partition is different from another access secret information for another partition of the plurality of partitions.

15. The non-transitory machine-readable storage medium of claim 14, wherein the second command is received through a management interface accessed using a further secret access information.

16. The non-transitory machine-readable storage medium of claim 1, wherein the configuration command is received at the storage system from a system separate from the storage system.

17. A storage library comprising:
a physical storage slot;
a storage drive;
a transport device to transport storage cartridges between different locations in the storage library;
a processor; and a non-transitory storage medium storing instructions executable on the processor to:
receive, in a configuration operation, a configuration command at the storage library from a system separate from the storage library, the configuration command comprising an information element set to a value specifying that a storage cartridge in the storage library is a restricted transport storage cartridge whose transport within the storage library in response to a command from outside the storage library is subject to restricted transport handling, wherein the configuration command is to configure the storage cartridge and is a Small Computer System Interface (SCSI) configuration command or a Non-Volatile Memory Express configuration command;
in response to the configuration command comprising the information element set to the value specifying that the storage cartridge is the restricted transport storage cartridge, store, in a memory, a restricted transport indication in association with the storage cartridge;
receive a second command to transport the storage cartridge from the physical storage slot to the storage drive;
determine whether the storage cartridge is associated with the restricted transport indication in the memory set by the configuration operation in response to the configuration command; and
in response to determining that the storage cartridge is associated with the restricted transport indication, check for an indication of receipt of an access secret information and deny processing of the second command to transport the storage cartridge responsive to determining that the indication of receipt of the access secret information is not present.

18. The storage library of claim 17, wherein the configuration command does not cause transport of the storage cartridge and does not cause access of data in the storage cartridge.

19. A method of a storage system comprising a storage drive, the method comprising:
as part of a configuration operation, receiving, at the storage system from a system separate from the storage system, a configuration command comprising an information element set to a value specifying that a storage cartridge in the storage system is a restricted transport storage cartridge whose transport within the storage system in response to a command from outside the storage system is subject to restricted transport handling, wherein the configuration command is to configure the storage cartridge and does not cause transport of the storage cartridge and does not cause access of data in the storage cartridge, and wherein the configuration command comprising the information element set to the value is a Small Computer System Interface (SCSI) configuration command or a Non-Volatile Memory Express configuration command;
in response to the configuration command comprising the information element set to the value specifying that the storage cartridge is the restricted transport storage cartridge, storing, in a memory, a restricted transport indication in association with the storage cartridge;
receiving, from a requester, a second command to transport the storage cartridge in the storage system from a physical storage slot to the storage drive;
determining whether the storage cartridge is associated with the restricted transport indication set in the memory by the configuration operation in response to the configuration command;
in response to determining that the storage cartridge is associated with the restricted transport indication, checking for an indication of receipt of an access secret information from the requester and denying processing of the second command to transport the storage cartridge responsive to determining the indication of receipt of the access secret information from the requester is not present;
receiving a third command to transport a further storage cartridge from another physical storage slot to the storage drive; and
in response to determining that the further storage cartridge is not associated with a restricted transport indication, allowing processing of the third command to transport the further storage cartridge.

\* \* \* \* \*